United States Patent
Keffer (10) Patent No.: US 8,651,137 B2
(45) Date of Patent: Feb. 18, 2014

(54) GAS MANIFOLD SYSTEM FOR STEADY GAS SUPPLY AT OUTLET

(75) Inventor: Gary E Keffer, Chesapeake, VA (US)

(73) Assignee: Crossroads Machine Inc., Chesapeake, VA (US)

( * ) Notice: Subject to any disclaimer, the term of this patent is extended or adjusted under 35 U.S.C. 154(b) by 166 days.

(21) Appl. No.: 13/278,657

(22) Filed: Oct. 21, 2011

(65) Prior Publication Data

US 2013/0098490 A1  Apr. 25, 2013

(51) Int. Cl.
*F17D 1/20* (2006.01)

(52) U.S. Cl.
USPC .......... 137/601.19; 137/599.01; 137/601.18; 251/127; 138/44

(58) Field of Classification Search
USPC .......... 137/331, 333, 599.01, 601.05, 601.19, 137/601.18; 251/127, 118; 138/40, 44, 42; 123/525–527
See application file for complete search history.

(56) References Cited

U.S. PATENT DOCUMENTS

| | | | | |
|---|---|---|---|---|
| 528,360 A | * | 10/1894 | Caldwell | 137/512.1 |
| 1,790,854 A | * | 2/1931 | DeFrance et al. | 48/189.4 |
| 2,509,456 A | * | 5/1950 | Saballus | 251/117 |
| 3,287,899 A | * | 11/1966 | Bintz | 60/299 |
| 3,943,899 A | * | 3/1976 | Matsuoka et al. | 123/585 |
| 5,113,837 A | * | 5/1992 | Faull | 123/587 |
| 5,245,976 A | * | 9/1993 | Faull | 123/587 |
| 5,495,872 A | * | 3/1996 | Gallagher et al. | 138/44 |
| 5,672,821 A | * | 9/1997 | Suzuki | 73/202 |
| 5,746,415 A | * | 5/1998 | Shimizu | 251/208 |
| 5,762,107 A | * | 6/1998 | Laws | 138/44 |
| 5,819,803 A | * | 10/1998 | Lebo et al. | 138/42 |
| 6,145,544 A | * | 11/2000 | Dutertre et al. | 138/39 |
| 6,186,179 B1 | * | 2/2001 | Hill | 138/39 |
| 6,951,617 B2 | * | 10/2005 | Fries et al. | 210/748.06 |
| 2012/0298232 A1 | * | 11/2012 | Ekholm | 137/599.01 |

\* cited by examiner

*Primary Examiner* — John Rivell
*Assistant Examiner* — Umashankar Venkatesan
(74) *Attorney, Agent, or Firm* — Peter J. Van Bergen (57) ABSTRACT

A gas manifold system includes a plenum that receives a gas at a positive pressure and a manifold having at least one exit port. One or more valves are disposed between the plenum and the manifold. When opened, the valve(s) permit a stream of the gas at positive pressure to flow from the plenum into the manifold. A baffle is disposed in the manifold between the valve(s) and the exit port(s). The baffle obstructs each stream of gas entering the manifold such that the gas is reduced to substantially zero pressure in the manifold at the exit port(s).

23 Claims, 6 Drawing Sheets

GAS MANIFOLD SYSTEM FOR STEADY GAS SUPPLY AT OUTLET

FIELD OF THE INVENTION

The invention relates generally to gas manifolds, and more particularly to a gas manifold system that provides a steady supply of a gas at the system's outlet.

BACKGROUND OF THE INVENTION

Motors running on diesel fuel are used in a wide variety of applications. For example, electric power generators used in remote locations (e.g., gas or oil drill sites, mining operations, etc.) are usually operated using diesel fuel. The high cost of diesel fuel has led to the development of dual-fuel supply systems for diesel fuel generators. In general, lower-cost natural gas is supplied directly into a diesel engine's manifold to reduce diesel fuel consumption. The mixture of gas-to-diesel is established/set for a particular generator motor speed which is typically the steady-state operating speed of the generator's motor. However, when motor speed must be increased (for higher load requirements) or decreased (for idle down times), the generator's diesel motor must be returned to "full diesel" operation as the adjustment of the gas-to-diesel ratio requires motor shut down. Such "full diesel" operation can greatly increase the cost of electric power generation.

In order to address this problem, gas manifold systems incorporating multiple controllable valves have been proposed for inclusion in the gas supply line of a dual fuel system. Briefly, the valves are controlled to vary the amount of natural gas being supplied. However, the supply of gas at the system's outlet tends to fluctuate as valve positions are changed. Further, each system must be custom built for each application to account for difference in supply lines, the number of diesel motors being supplied, etc.

SUMMARY OF THE INVENTION

Accordingly, it is an object of the present invention to provide a gas manifold system.

Another object of the present invention is to provide a gas manifold system that can adjust the amount of gas available at its outlet(s) while keeping a steady gas flow thereat.

Still another object of the present invention is to provide a gas manifold system that is readily adapted to a variety of installation configurations.

Other objects and advantages of the present invention will become more obvious hereinafter in the specification and drawings.

In accordance with the present invention, a gas manifold system includes a plenum adapted to receive a gas at a positive pressure and a manifold having at least one exit port. At least one valve is disposed between the plenum and the manifold such that, when opened, the valve(s) so-opened permit a stream of the gas at positive pressure to flow from the plenum into the manifold. A baffle is disposed in the manifold between the valve(s) and the exit port(s) for obstructing each stream of gas entering the manifold such that the gas is reduced to substantially zero pressure in the manifold at the exit port(s).

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
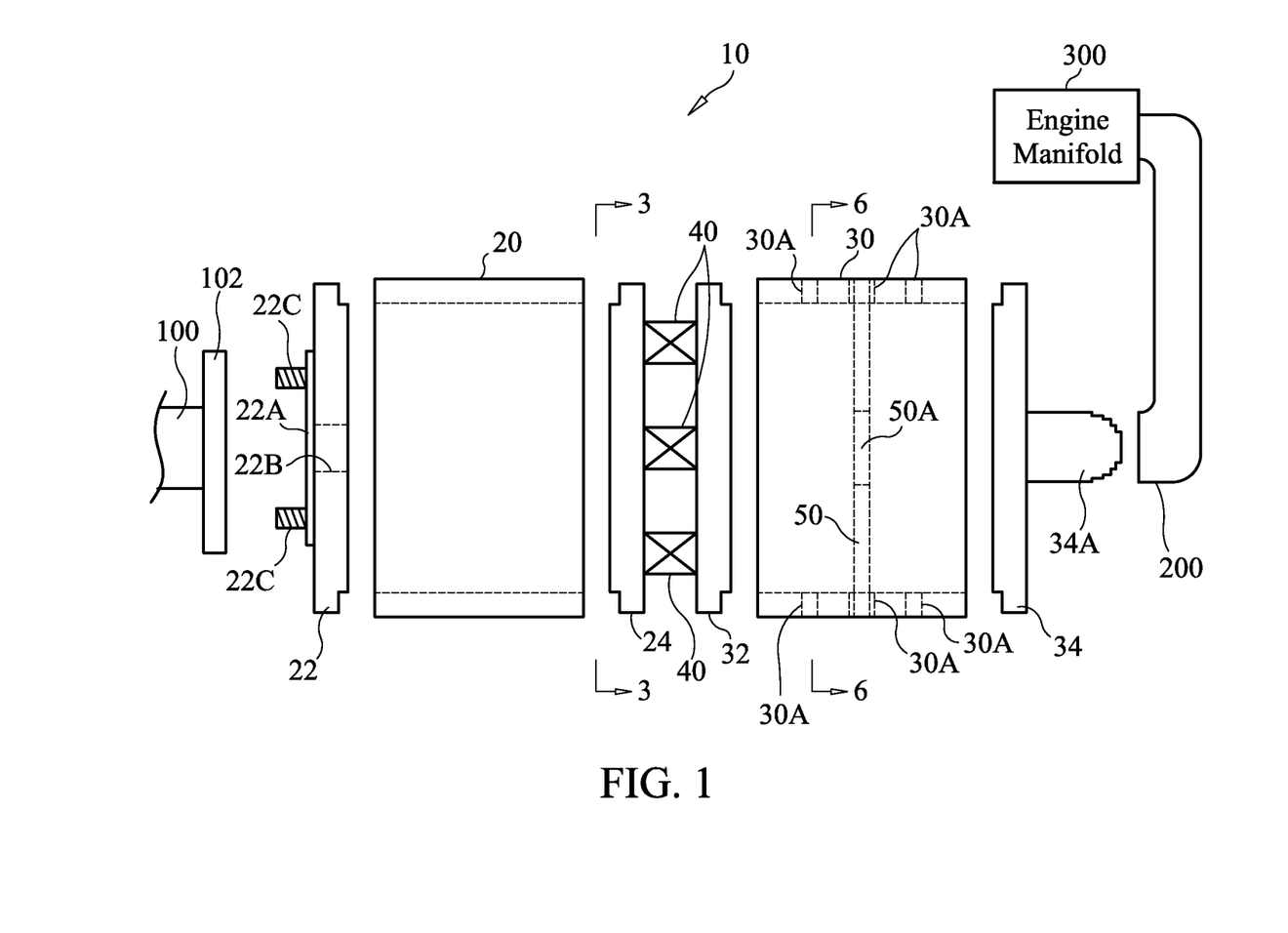
FIG. 1 is a side, exploded view of a gas manifold system in accordance with an embodiment of the present invention.

Referring now to the drawings and more particularly to FIG. 1, a gas manifold system in accordance with an embodiment of the present invention is shown and is referenced generally by numeral 10. Gas manifold system 10 is illustrated in an exploded fashion to more clearly show the novel construction thereof. By way of example, gas manifold system 10 will be explained for its use in the supply of natural gas to an electric power generator (not shown) that operates on diesel fuel and natural gas. As is known in the art, the natural gas is supplied to the air intake of a diesel engine manifold 300. Accordingly, gas manifold system 10 is disposed in a gas supply system that includes a gas supply line 100 through which a gas under pressure (e.g., natural gas) flows and is supplied to system 10. The gas passes through system 10 and is drawn therefrom through a gas suction line 200 (or multiple gas suction lines). That is, the gas at the outlet(s) of system 10 is at a substantially zero pressure so that the suction in line 200 governs the quantity of gas flowing therethrough. For a diesel/gas electric power generator, this means that the generator's engine manifold 300 draws an amount of natural gas through line 200 based on the operating needs (i.e., engine speed) of the generator (not shown) coupled to engine manifold 300. This allows the natural gas to be part of the fuel supply even when the generator's motor speeds are changed.

In its illustrated embodiment, gas manifold system 10 is modular for easy adaptation to a particular type of gas supply line 100 and/or one (or more) gas suction line 200 where each suction line 200 would be coupled to a separate engine manifold 300 of an associated electric generator. System 10 includes two open-ended tubes (e.g., cylinders) 20 and 30, end caps 22 and 24 (associated with cylinder 20), end caps 32 and 34 (associated with cylinder 30), one or more valves 40 disposed between end caps 24 and 32, and a baffle 50 disposed in cylinder 30. The various elements of the present invention are constructed of materials designed to withstand the rigors of their operating environment as would be understood by one of ordinary skill in the art.

Cylinders 20 and 30 are of rigid-wall construction with cylinder 20 being part of a gas plenum that holds gas under pressure supplied via line 100. Coupled/sealed to either open end of cylinder 20 are end caps 22 and 24. Cylinder 30 is part of a gas manifold that makes gas at a substantially zero pressure available to line(s) 200. Coupled/sealed to either open end of cylinder 30 are end caps 32 and 34.

Figure 2:
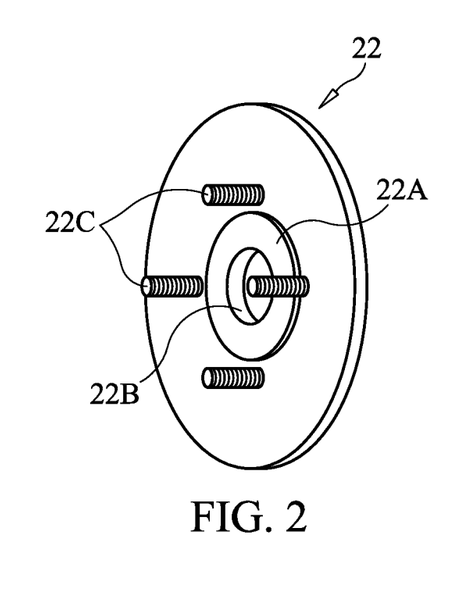
FIG. 2 is a perspective view of a removable end cap of the system's inlet plenum in accordance with an embodiment of the present invention.

In one embodiment of the present invention, end cap 22 is configured to work with one of the well known coupling interfaces (e.g., DIN 65, DIN 80, etc.) used on gas supply lines. To accommodate a DIN coupling, end cap 22 has a raised annular flange 22A on its exterior face circumscribing a port 22B passing through end cap 22. Dispersed around annular flange 22A are a number of threaded rods (i.e., bolt shafts) 22C. The size of annular flange 22A and number/size/placement of threaded rods 22C are selected predicated on the type of hose coupling 102 terminating supply line 100. Accordingly, gas manifold system 10 can be adapted to work with any type of hose coupling 102 simply by changing end cap 22.

Figure 3:
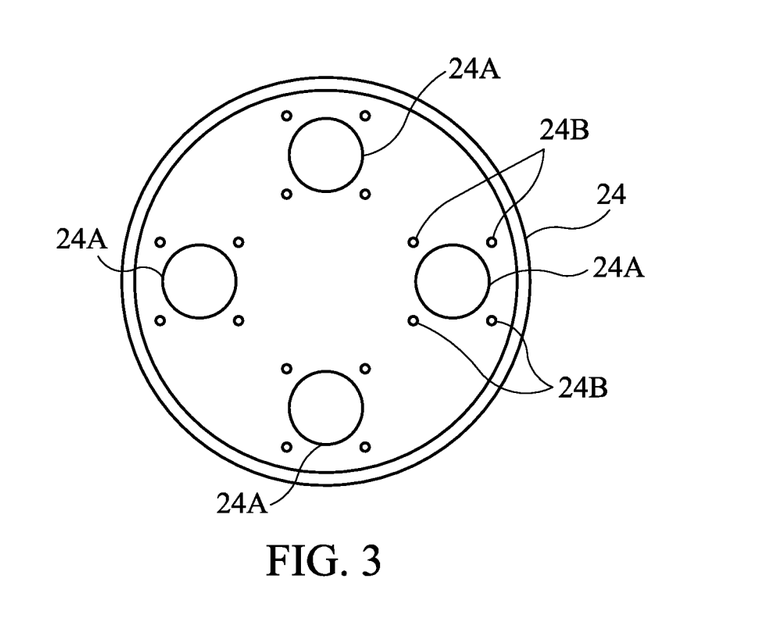
FIG. 3 is a plan view of one side of the system's valve assembly taken along line 3-3 of FIG. 1 in accordance with an embodiment of the present invention.

End cap 24 is coupled/sealed to cylinder 20 at its open end that opposes the end accepting end cap 22. End cap 24 along with end cap 32 also form a support structure for one or more valves 40 disposed between and coupled/sealed to end caps 24 and 32, while also allowing valves 40 to be in fluid communication with cylinders 20 and 30. Accordingly, end caps 24 and 32 have one or more ports extending therethrough. For example, the illustrated embodiment has four ports 24A (as illustrated in FIG. 3) distributed about an annular region of end cap 24 to support four of valves 40. A similar number and locations of ports are provided in end cap 32. The mounting/sealing of valves 40 to end caps 24 and 32 can be achieved in a variety of ways without departing from the scope of the present invention. For example, bolt holes 24B can be provided around each of ports 24A to facilitate the attachment of valves 40 to end cap 24. Similar bolt holes could be provided in end cap 32.

Figure 4:
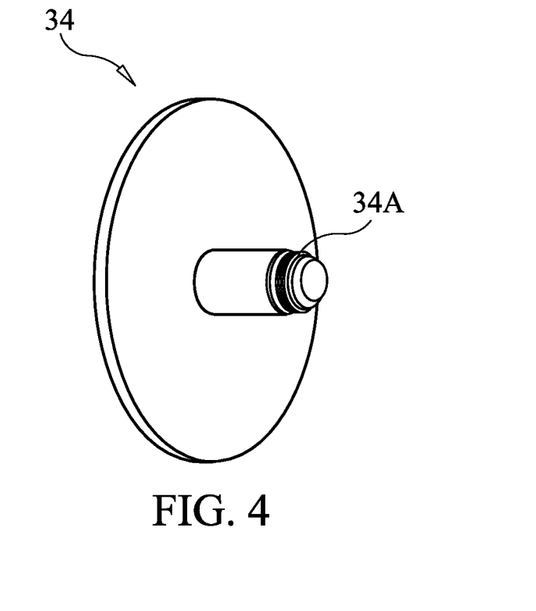
FIG. 4 is a perspective view of removable end cap of the system's outlet plenum in accordance with an embodiment of the present invention.

End cap 34 is coupled/sealed to cylinder 30 at its open end that opposes the end accepting end cap 32. End cap 34 has one or more nozzle(s) 34A (FIG. 4) coupled to or integrated with end cap 34. The size/shape of nozzle 34A is designed to work with suction line 200. If system 10 is to be used with multiple suction lines 200, end cap 34 is provided with a corresponding number of nozzles 34A.

Figure 5:
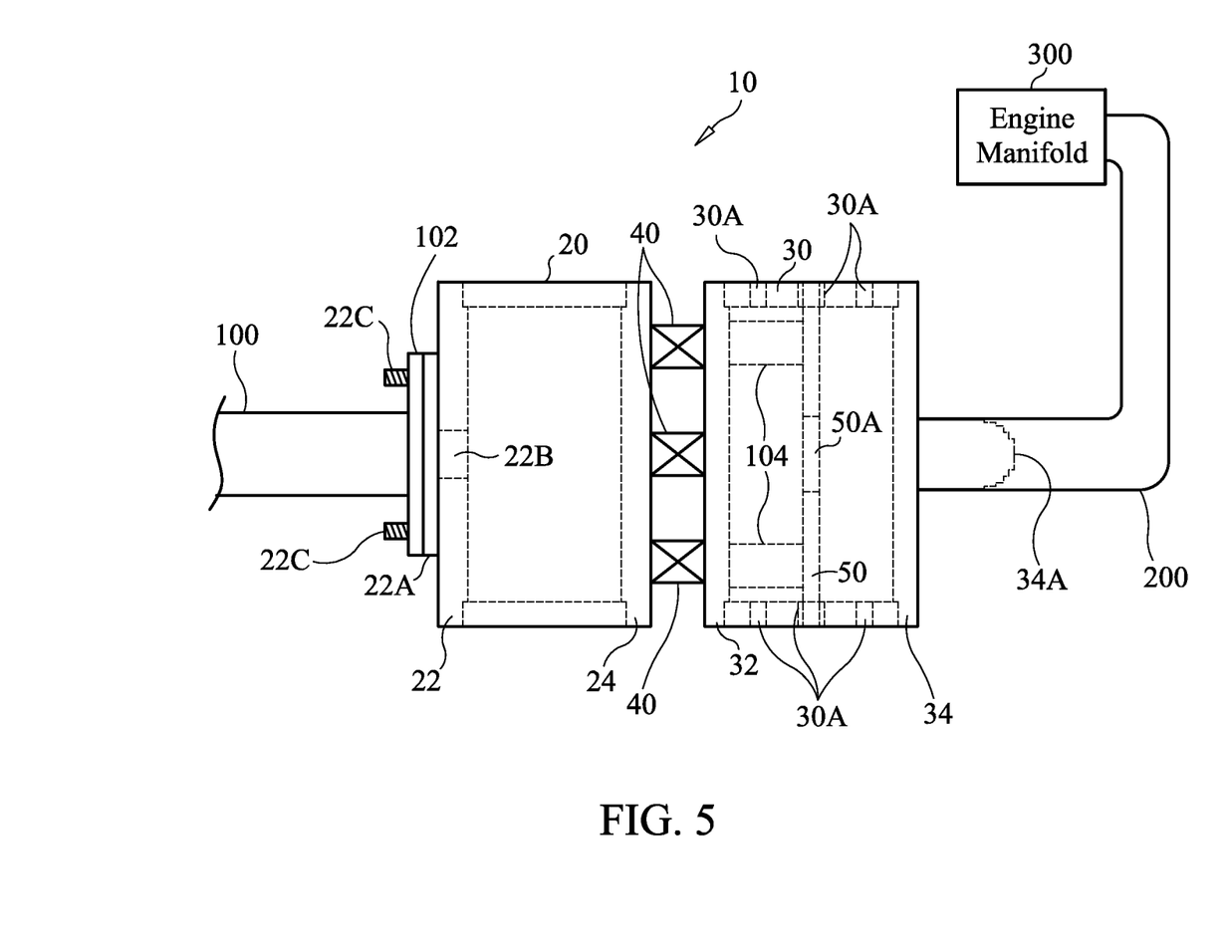
FIG. 5 is a side view of the assembled gas manifold system.

Referring additionally now to FIG. 5 where the above-described elements of system 10 are joined together, gas under pressure supplied via line 100 is passed through end cap 22 and into cylinder 20. One or more of valves 40 is opened predicated on the amount of gas needed in suction line 200. For any of valves 40 that are opened, a volumetric stream of gas is introduced into cylinder 30 through end cap 32 where each such stream is referenced by numeral 104. By way of illustrated example, two of valves 40 are opened such that two corresponding streams 104 of gas are introduced into cylinder 30. In general, streams 104 are obstructed by baffle 50 in cylinder 30 such that the admitted gas cannot flow directly to any nozzle 34A in end cap 34. The combination of the volume of cylinder 30 and the obstructed flow provided by baffle 50 assures that the pressure of the gas at outlet nozzle(s) 34A is reduced to a substantially zero pressure. In this way, the amount of gas supplied to any suction line 200 is completely governed by the demand/needs of its manifold 300.

Figure 6:
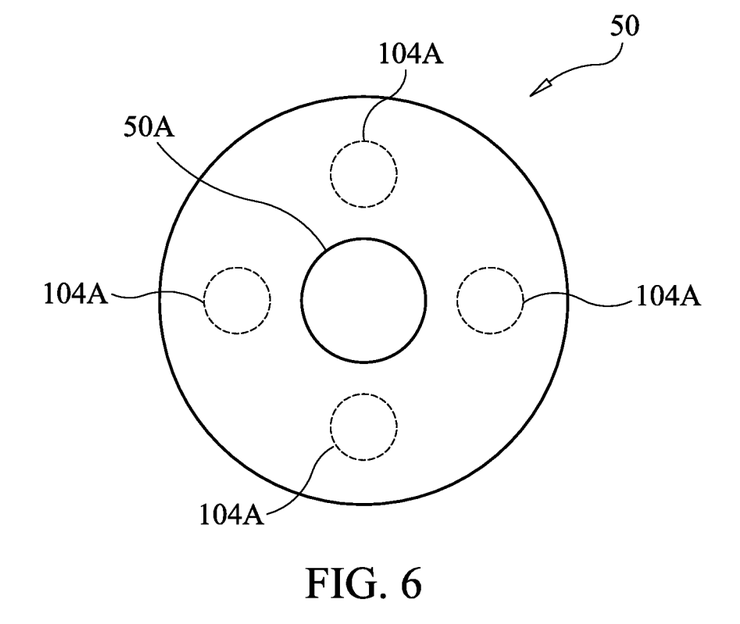
FIG. 6 is a plan view of the system's outlet plenum taken along line 6-6 of FIG. 1 to illustrate the system's baffle in accordance with an embodiment of the present invention.

Referring additionally now to FIG. 6, baffle 50 can be a plate having one or more holes therethrough with the hole(s) being positioned based on location(s) of valve(s) 40. For the illustrated embodiment, baffle 50 is a solid plate with a hole 50A through its central region. More specifically, hole 50A is located such that it will not overlap any cross-sectional portion of a stream 104 of gas passed through an opened one of valves 40 when stream 104 impinges on baffle 50. Accordingly, the cross-sectional shapes of each possible stream 104 is indicated by dashed-line circles in FIG. 6. Thus, the size, shape, and location of the solid regions of baffle 50 are strategically selected to fully obstruct each such gas stream cross-section if the corresponding valve 40 is opened. Baffle 50 can be mounted in cylinder 30 by providing an annular channel 30A on an inside wall thereof. For greater flexibility in designing and positioning baffle 50, additional annular channels 30A can be provided in cylinder 30.

Figure 7:
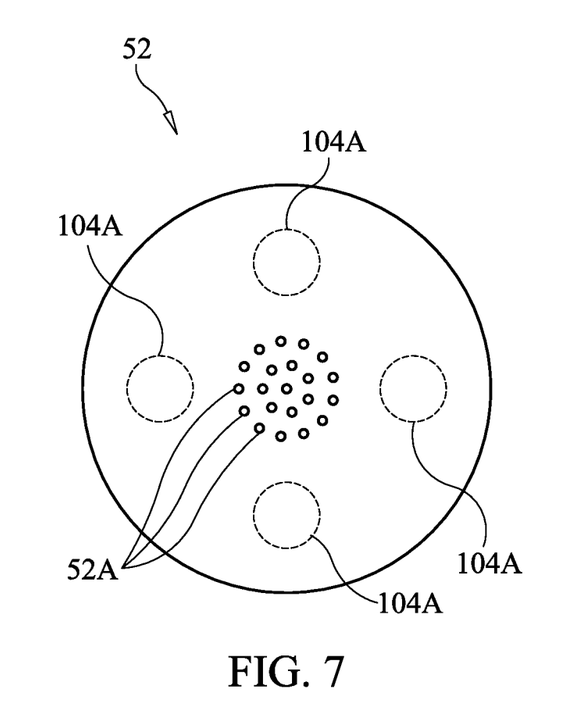
FIG. 7 illustrates an isolated plan view of a baffle in accordance with another embodiment of the present invention.
Figure 8:
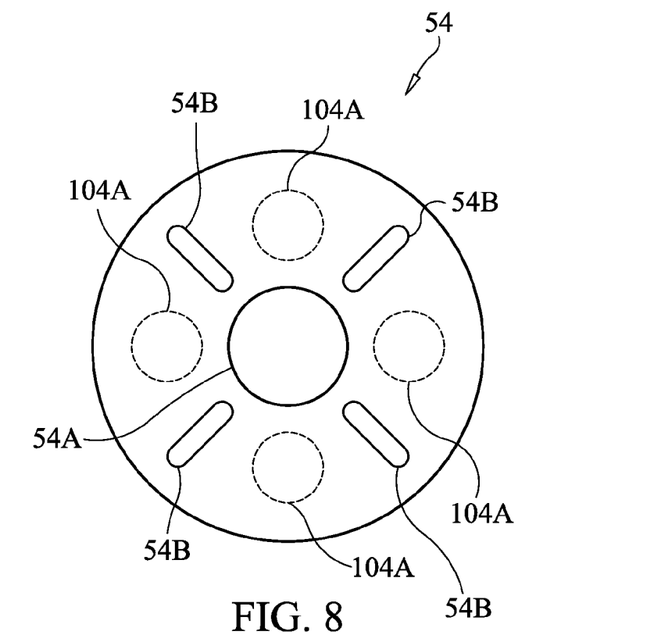
FIG. 8 illustrates an isolated plan view of a baffle in accordance with still another embodiment of the present invention.

Although the above-described baffle 50 has a solid annular region circumscribing a single central hole, the present invention is not so limited. For example, FIG. 7 illustrates another baffle 52 in which a solid annular region circumscribes a plurality holes 52A in the baffle's central region. Still another baffle 54 is illustrated in FIG. 8 where the outer annular region incorporates slots 54B with a single hole 54A circumscribed by the baffle's annular region. Note that slots 54B do not overlap any portion of stream cross-sections 104A.

Figure 9:
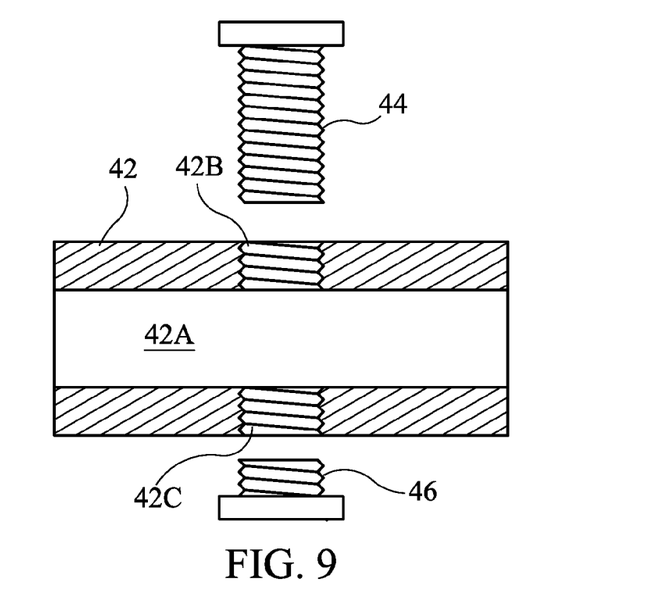
FIG. 9 is a cross-sectional view of a manually-operated valve provided in the valve system in accordance with an embodiment of the present invention.

Valves 40 can include manual and powered valves. Powered valves would generally have control lines (not shown) coupled thereto with some remotely-located controller governing the opening and closing the valves. For manual valves, hand-operated controls must be accessible. To improve adaptability of system 10 to a wide variety of installation configurations, the present invention can include the use of one or more of the manual valves illustrated in FIG. 9 where a valve body 42 defines a central flow region 42A. Threaded holes 42B and 42C provided on sides of valve body 42 are transverse to its flow region 42A. Holes 42B and 42C are aligned with one another such that a screw 44 can threadably engage one or both of holes 42B and 42C to partially span or fully cut off flow region 42A. Screw 44 can be started in either hole 42B or 42C. In this way, valve 42 can be controlled from either side thereof simply by changing the entry point for screw 44. To assure that valve 42 only permits flow through flow region 42A regardless of the position of screw 44, a threaded plug 46 is screwed partially into the hole 42B or 42C that opposes the start hole for screw 44. In the illustrated embodiment, plug 46 is screwed into hole 42C thereby sealing it even if screw 44 is positioned for partial or full flow through flow region 42A.

Figure 10:
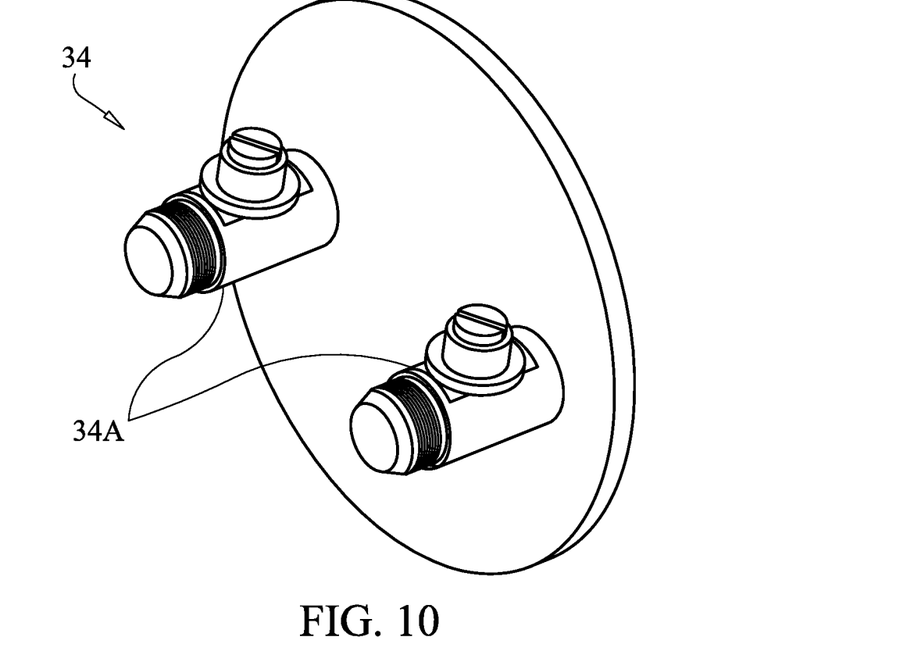
FIG. 10 is a perspective view of a removable end cap of the system's outlet plenum provided with two adjustable-flow outlet nozzles in accordance with another embodiment of the present invention.
Figure 11:
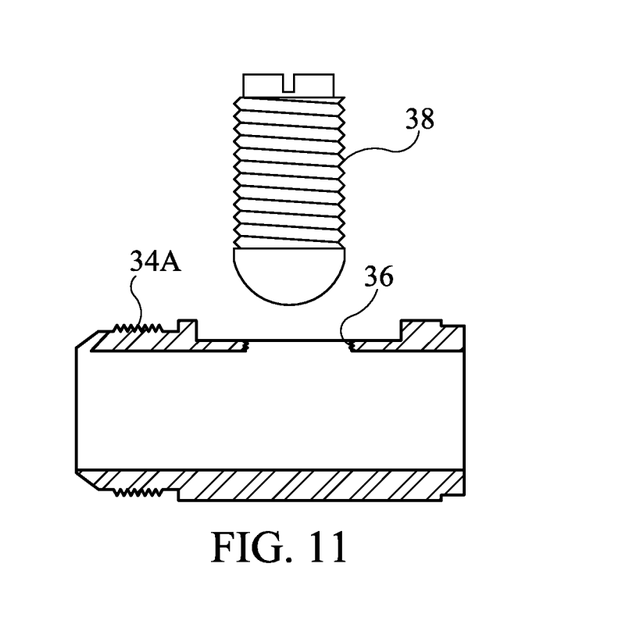
FIG. 11 is a cross-sectional exploded view of one adjustable-flow outlet nozzle in accordance with an embodiment of the present invention.

As mentioned above, end cap 34 can include a plurality of nozzles 34A. Further, each such nozzle can incorporate a valve thereby providing additional adjustability in the flow of gas moving through a particular outlet nozzle. Accordingly, FIG. 10 illustrates an end cap 34 with two nozzles 34A provided thereon or integrated therewith. Referring additionally to FIG. 11, each nozzle 34A can incorporate an adjustable valve created by providing a hole 36 in each nozzle 34A and providing a screw 38 threaded into/through hole 36 such that the screw 38 can regulate the amount of gas passing through nozzle 34A.

The advantages of the present invention are numerous. The gas manifold system provides readily-varied quantities of gas at substantially zero pressure so that one or more suction lines can draw the amount of gas needed. These features are particularly advantageous when the gas manifold system is used to support the gas needs of an electric power generator using both diesel fuel and natural gas. The present invention supports a variety of speeds of the generator's motor thereby insuring a lower-cost and more efficient generator operation during all operating modes thereof. The gas manifold system is readily adapted to different supply/suction line installations simply by changing one or both of the system's outboard end caps.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

The invention claimed is:

1. A gas manifold system, comprising:
a plenum adapted to receive a gas at a positive pressure;
a manifold having at least one exit port;
at least one valve disposed between said plenum and said manifold wherein, when opened, said at least one valve permits a stream of said gas at said positive pressure to flow from said plenum into said manifold; and
a baffle disposed in said manifold between said at least one valve and said at least one exit port, said baffle defined by solid wall portions and at least one hole, said baffle positioned relative to said at least one valve such that each said stream impinges only on said solid wall portions thereby obstructing each said stream entering said manifold wherein said gas is reduced to substantially zero pressure in said manifold at each said exit port.

2. A gas manifold system as in claim 1, wherein said at least one valve comprises a plurality of valves.

3. A gas manifold system as in claim 2, wherein said plurality of valves are distributed in an annular region defined between said plenum and said manifold.

4. A gas manifold system as in claim 1, wherein said baffle comprises a plate coupled to said manifold.

5. A gas manifold system as in claim 4, wherein an inner wall of said manifold includes at least one annular channel formed therein for receiving said plate.

6. A gas manifold system as in claim 2, wherein one of said valves comprises a manually-controlled valve that includes:
a valve body defining a flow region;
a first threaded hole formed through said valve body in a direction transverse to said flow region;
a second threaded hole formed through said valve body in a direction transverse to said flow region and aligned with said first threaded hole;
a screw for threaded engagement with and through said first threaded hole and partial threaded engagement with said second threaded hole, wherein said screw spans and obstructs said flow region; and
a plug for partial threaded engagement with said second threaded hole.

7. A gas manifold system, comprising:
a plenum having a removable end adapted to have a gas line coupled thereto wherein a gas at a positive pressure is introduced into said plenum;
a manifold having a removable end with at least one exit nozzle formed therein;
an adjustable valve incorporated in each said exit nozzle;
a plurality of valves disposed between said plenum and said manifold wherein, when any of said valves is opened, each of said valves so-opened emits a stream of said gas at said positive pressure into said manifold; and
a baffle disposed in said manifold between said valves and said at least one exit nozzle for obstructing each said stream entering said manifold wherein said gas is reduced to substantially zero pressure in said manifold at each said exit nozzle.

8. A gas manifold system as in claim 7, wherein said plurality of valves are distributed in an annular region defined between said plenum and said manifold.

9. A gas manifold system as in claim 7, wherein said baffle includes a solid wall portion spaced apart from said valves and encompassing a cross-section of each said stream thereat.

10. A gas manifold system as in claim 7, wherein said baffle comprises a plate coupled to said manifold, said plate including a solid wall portion spaced apart from said valves and encompassing a cross-section of each said stream thereat, said plate further including at least one hole therethrough.

11. A gas manifold system as in claim 8, wherein said baffle comprises a plate coupled to said manifold, said plate including a solid wall portion spaced apart and aligned with said annular region and encompassing a cross-section of each said stream thereat, said plate further including at least one hole therethrough.

12. A gas manifold system as in claim 11, wherein said at least one hole does not overlap any of said cross-section of each said stream at said solid wall portion.

13. A gas manifold system as in claim 10, wherein an inner wall of said manifold includes at least one annular channel formed therein for receiving said plate.

14. A gas manifold system as in claim 7, wherein one of said valves comprises a manually-controlled valve that includes:
a valve body defining a flow region;
a first threaded hole formed through said valve body in a direction transverse to said flow region;
a second threaded hole formed through said valve body in a direction transverse to said flow region and aligned with said first threaded hole;
a screw for threaded engagement with and through said first threaded hole and partial threaded engagement with said second threaded hole, wherein said screw spans and obstructs said flow region; and
a plug for partial threaded engagement with said second threaded hole.

15. A gas manifold system, comprising:
a first cylinder sealed at one end thereof by a removable gas inlet end cap having an exterior face that includes a raised annular flange and a plurality of threaded rods extending from said exterior face and distributed around said annular flange, said annular flange and said threaded rods being adapted to have a gas line coupled thereto wherein a gas at a positive pressure is introduced into said first cylinder, said first cylinder having an opposing end that is open;
a second cylinder sealed at one end thereof by a removable gas outlet end cap with at least one exit nozzle formed therein, said second cylinder having an opposing end that is open;
a valve arrangement sealed to said opposing end associated with said first cylinder and said opposing end associated with said second cylinder, said valve arrangement including at least one valve disposed between said first cylinder and said second cylinder wherein, when any of said at least one valve is opened, each said valve so-opened emits a stream of said gas at said positive pressure into said second cylinder; and
a baffle disposed in said second cylinder between said at least one valve and said at least one exit nozzle for obstructing each said stream of said gas entering said second cylinder wherein said gas is reduced to substantially zero pressure in said second cylinder at each said exit nozzle.

16. A gas manifold system as in claim 15, wherein said at least one valve comprises a plurality of valves distributed in an annular region of said valve arrangement.

17. A gas manifold system as in claim 15, wherein said baffle includes a solid wall portion spaced apart from said at least one valve and encompassing a cross-section of each said stream of said gas thereat.

18. A gas manifold system as in claim 15, wherein said baffle comprises a plate coupled to said second cylinder, said plate including a solid wall portion spaced apart from said at least one valve and encompassing a cross-section of each said stream of said gas thereat, said plate further including at least one hole therethrough.

19. A gas manifold system as in claim 16, wherein said baffle comprises a plate coupled to said second cylinder, said plate including a solid annular portion spaced apart and aligned with said annular region and encompassing a cross-section of each said stream of said gas thereat, said solid annular portion circumscribing at least one hole in said plate.

20. A gas manifold system as in claim 18, wherein an inner wall of said second cylinder includes at least one annular channel formed therein for receiving said plate.

21. A gas manifold system as in claim 15, wherein said at least one valve comprises a manually-controlled valve that includes:
  a valve body defining a flow region;
  a first threaded hole formed through said valve body in a direction transverse to said flow region;
  a second threaded hole formed through said valve body in a direction transverse to said flow region and aligned with said first threaded hole;
  a screw for threaded engagement with and through said first threaded hole and partial threaded engagement with said second threaded hole, wherein said screw spans and obstructs said flow region; and
  a plug for partial threaded engagement with said second threaded hole.

22. A gas manifold system as in claim 15, further comprising an adjustable valve incorporated in each said exit nozzle.

23. A gas manifold system as in claim 15, wherein said valve arrangement further includes end caps with said at least one valve being disposed therebetween, a first of said end caps sealed to said opposing end associated with said first cylinder and a second of said end caps sealed to said opposing end associated with said second cylinder.

* * * * *